(12) United States Patent
Challener et al.

(10) Patent No.: US 9,512,715 B2
(45) Date of Patent: Dec. 6, 2016

(54) SYSTEMS AND METHODS FOR PRESSURE AND TEMPERATURE MEASUREMENT

(71) Applicant: General Electric Company, Schenectady, NY (US)

(72) Inventors: William Albert Challener, Niskayuna, NY (US); Li Airey, Milton Keynes (GB)

(73) Assignee: General Electric Company, Niskayuna, NY (US)

( * ) Notice: Subject to any disclaimer, the term of this patent is extended or adjusted under 35 U.S.C. 154(b) by 456 days.

(21) Appl. No.: 13/954,296

(22) Filed: Jul. 30, 2013

(65) Prior Publication Data

US 2015/0033841 A1  Feb. 5, 2015

(51) Int. Cl.
| | |
|---|---|
| *E21B 47/06* | (2012.01) |
| *E21B 47/04* | (2012.01) |
| *G01K 1/02* | (2006.01) |
| *G01K 7/32* | (2006.01) |
| *G01L 9/00* | (2006.01) |
| *G01L 19/00* | (2006.01) |
| *G01L 27/00* | (2006.01) |

(52) U.S. Cl.
CPC .............. *E21B 47/04* (2013.01); *G01K 1/024* (2013.01); *G01K 7/32* (2013.01); *G01L 9/0017* (2013.01); *G01L 19/0092* (2013.01); *G01L 27/002* (2013.01)

(58) Field of Classification Search
USPC .................. 73/152.16, 702, 862.41, 862.59, 708, 73/579; 324/636
See application file for complete search history.

(56) References Cited

U.S. PATENT DOCUMENTS

| | | | | |
|---|---|---|---|---|
| 3,927,369 A | * | 12/1975 | Billeter | G01K 5/52 324/636 |
| 3,939,406 A | * | 2/1976 | Billeter | G01F 1/34 324/636 |
| 4,972,076 A | * | 11/1990 | Willson | G01L 9/002 250/227.21 |
| 5,338,929 A | * | 8/1994 | Douma | G01L 9/002 250/227.21 |
| 7,362,422 B2 | | 4/2008 | DiFoggio et al. | |
| 7,379,629 B1 | * | 5/2008 | Burns | G01L 9/002 385/12 |
| 8,253,945 B2 | | 8/2012 | Gahan et al. | |
| 8,256,298 B2 | | 9/2012 | Suijlen et al. | |
| 8,429,978 B2 | | 4/2013 | Klosinski et al. | |

(Continued)

*Primary Examiner* — Hezron E Williams
*Assistant Examiner* — Xin Zhong
(74) *Attorney, Agent, or Firm* — Jason K. Klindtworth (57) ABSTRACT

A measurement system in one embodiment includes an acquisition module and a determination module. The acquisition module is configured to acquire resonant frequency information corresponding to a sensor disposed in a remote location from the acquisition module. The resonant frequency information includes first resonant frequency information for a first resonant frequency of the sensor corresponding to environmental conditions of the remote location, and also includes second resonant frequency information for a different, second resonant frequency of the sensor corresponding to the environmental conditions of the remote location. The determination module is configured to use the first resonant frequency information and the second resonant frequency information to determine the temperature and the pressure at the remote location.

20 Claims, 5 Drawing Sheets

(56) References Cited

U.S. PATENT DOCUMENTS

2010/0154553 A1    6/2010  Phan Le et al.
2010/0189444 A1    7/2010  Vernooy et al.
2010/0321191 A1*  12/2010  Gong ..................... G01N 22/02
                                                            340/584

* cited by examiner

FIG. 5

SYSTEMS AND METHODS FOR PRESSURE AND TEMPERATURE MEASUREMENT

STATEMENT REGARDING FEDERALLY SPONSORED RESEARCH AND DEVELOPMENT

This invention was made with government support under U.S. Government Contract Number DE-EE0002787 awarded by the Department of Energy. The U.S. Government may have certain rights in this invention.

BACKGROUND

Various devices have been developed for measuring environmental conditions of a given location, such as temperature or pressure. However, numerous locations present challenges to many of these devices. For example, many devices may not be appropriate for use in higher temperature environments, such as geothermal wells, oil wells, or the like.

Micro-electromechanical system (MEMS) sensors have been utilized, for example, to measure pressure in challenging environments such as geothermal wells. Conventionally, a relationship between a resonant frequency of MEMS sensor and the pressure may be utilized to measure pressure. However, to determine the pressure from the resonant frequency, the temperature of the sensor typically must be known or estimated. Conventionally, a second, different type of sensor is used to measure the temperature.

Such conventional approaches suffer from a variety of drawbacks. For example, the temperature and pressure may be detected at separate locations, which may impair accuracy. Also, the use of two sensing devices and related equipment or components may increase expense, as well as increase maintenance time and related cost and inconvenience.

BRIEF DESCRIPTION

In one embodiment, a measurement system is provided including an acquisition module and a determination module. The acquisition module is configured to acquire resonant frequency information corresponding to a sensor disposed in a remote location from the acquisition module. The resonant frequency information includes first resonant frequency information corresponding to a first resonant frequency of the sensor. The first resonant frequency corresponds to environmental conditions of the remote location. The resonant frequency information also includes second resonant frequency information corresponding to a different, second resonant frequency of the sensor corresponding to the environmental conditions of the remote location. The determination module is configured to use the first resonant frequency information and the second resonant frequency information to determine the temperature and the pressure of the remote location.

In another embodiment, a method is provided including obtaining, from a sensor disposed in a remote location, first resonant frequency information corresponding to a first resonant frequency of the sensor. The first resonant frequency corresponds to environmental conditions of the remote location. The method also includes obtaining, from the sensor, second resonant frequency information corresponding to a different, second resonant frequency of the sensor, with the second resonant frequency corresponding to the environmental conditions of the remote location. The method further includes determining, with a determination module, a temperature and a pressure of the remote location using the first and second resonant frequency information.

In another embodiment, a tangible and non-transitory computer readable medium is provided. The computer readable medium includes one or more computer software modules configured to obtain, from a sensor disposed in a remote location, first resonant frequency information corresponding to a first resonant frequency of the sensor. The first resonant frequency corresponds to environmental conditions of the remote location. The one or more computer software modules are also configured to obtain, from the sensor, second resonant frequency information corresponding to a different, second resonant frequency of the sensor. The second resonant frequency also corresponds to the environmental conditions of the remote location. Further, the one or more computer software modules are configured to determine a temperature and a pressure of the remote location using the first and second resonant frequency information.

DETAILED DESCRIPTION

Various embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors, controllers or memories) may be implemented in a single piece of hardware (e.g., a general purpose signal processor or random access memory, hard disk, or the like) or multiple pieces of hardware. Similarly, any programs may be stand-alone programs, may be incorporated as subroutines in an operating system, may be functions in an installed software package, and the like. It should be understood that the various embodiments are not limited to the arrangements and instrumentality shown in the drawings.

As used herein, the terms "system," "unit," or "module" may include a hardware and/or software system that operates to perform one or more functions. For example, a module, unit, or system may include a computer processor, controller, or other logic-based device that performs operations based on instructions stored on a tangible and non-transitory computer readable storage medium, such as a computer memory. Alternatively, a module, unit, or system may include a hard-wired device that performs operations based on hard-wired logic of the device. The modules or units shown in the attached figures may represent the hardware that operates based on software or hardwired instructions, the software that directs hardware to perform the operations, or a combination thereof. As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Generally, various embodiments provide for obtaining accurate pressure and temperature measurements from a single sensor. In various embodiments, a sensor (e.g., a micro-electrical mechanical system (MEMS) sensor) is designed to vibrate at two or more resonant frequencies, for example under the excitation of a provided laser beam. The resonant frequencies may depend, for example, on the temperature of the sensor. The resonant frequencies may also depend, for example, on a pressure (e.g., atmospheric pressure) exerted on the sensor. The configuration of the external housing or packaging of the sensor may determine or influence the resonant frequencies as well as the effect that changes in temperature and pressure have on the resonant frequencies. In various embodiments, the sensor packaging is designed such that strain caused by external pressure and/or changes in sensor temperature cause the resonant frequencies to change. Further, the sensor packaging may be designed or configured such that the type or four of variation (e.g., one or more of a rate of change, a direction of change, or a formula describing the variation) in frequency based on changes in pressure and temperature are different for at least two different resonant modes of the sensor. Thus, the temperature and pressure may be simultaneously determined by measuring resonant frequencies of two or more modes.

At least one technical effect of various embodiments is providing for the measurement of pressure and temperature by one sensor. At least one technical effect of various embodiments is reduced cost of and/or potential for damage to measurement equipment (e.g., measurement equipment for use in hazardous, dangerous, high pressure, and/or high temperature environments) and processing equipment for determining environmental measurements. At least one technical effect of various embodiments is providing for the measurement of pressure and temperature in the same location. At least one technical effect of various embodiments is improved consistency in temperature and pressure measurements. At least one technical effect of various embodiments is improved measurement in environments where thermocouples may not survive and/or may be an explosion hazard.

Figure 1:
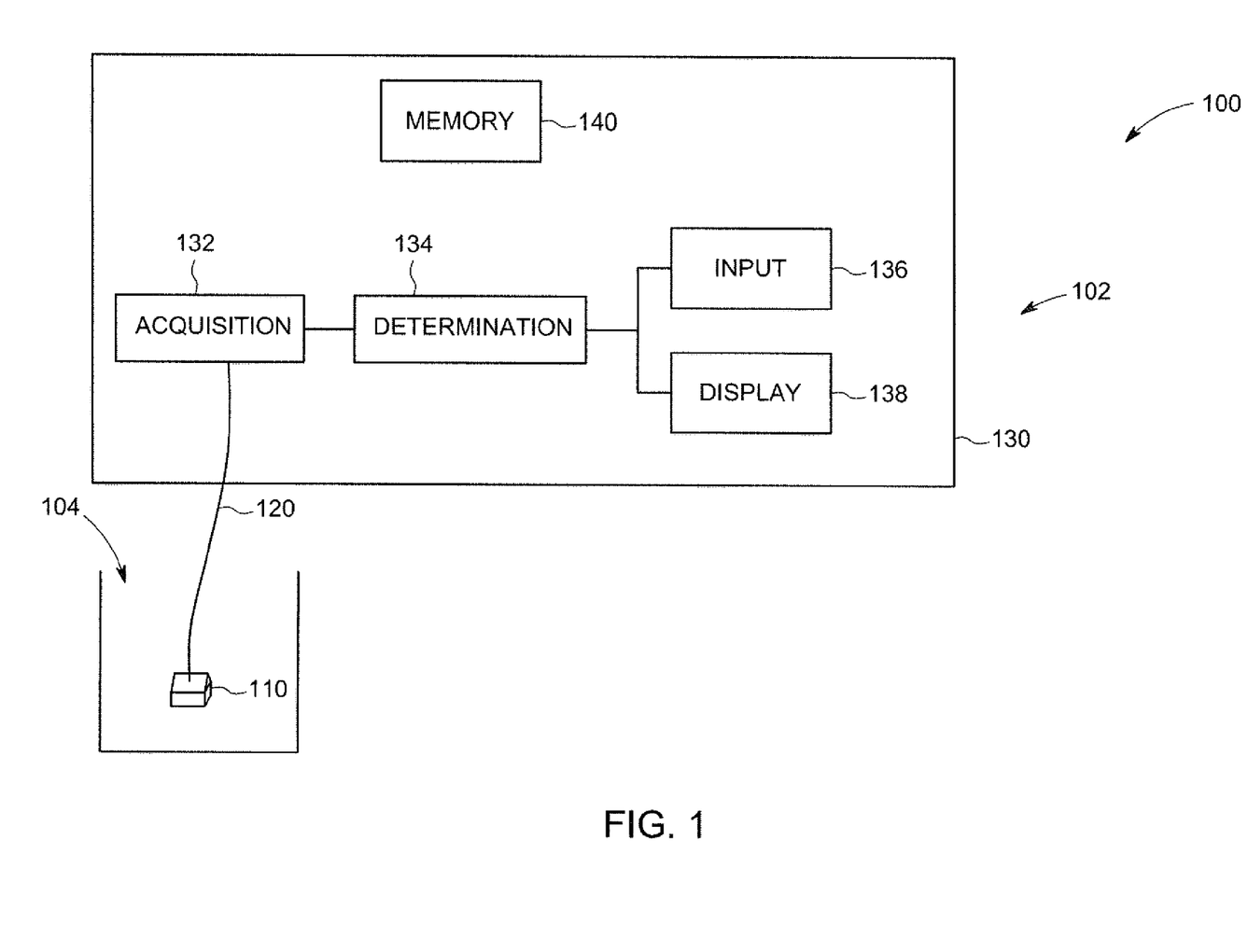
FIG. 1 is a schematic block diagram of a measurement system in accordance with various embodiments.

FIG. 1 is a schematic view of a measurement system 100 formed in accordance with various embodiments. The measurement system 100 is configured to measure one or more environmental conditions of a remote location 104. In the illustrated embodiment, the measurement system 100 is configured to measure or determine the temperature and pressure of the remote location 104. The remote location 104 may be subject to environmental conditions (such as temperature or pressure) that may be damaging to certain electronic equipment, such as thermocouples. For example, the remote location 104 may be a geothermal well or an oil well, among others. In various embodiments, the remote location 104, for example, may be at a temperature at or above about 150 degrees Celsius, at or above about 250 degrees Celsius, at or above about 300 degrees Celsius, or at or above about 400 degrees Celsius, as examples. In some embodiments, the remote location 104 may be at a pressure at or above about 30,000 pounds per square inch (psi), for example. The remote location 104 may be understood as being remote in that the remote location 104 is located at a distance from a processing and/or determination unit of the measurement system. Thus, the processing and/or determination unit may be maintained under different environmental conditions than the remote location 104.

The measurement system 100 depicted in FIG. 1 includes a sensor 110 operably connected to a processing module 130 by a link 120. The sensor 110 is shown disposed within the remote location 104, while the processing module 140 is disposed at a distance from the remote location 104. Thus, only the sensor 110 and a portion of the link 120 are subjected to the environmental conditions of the remote location 104, while the processing module 130 is not. Generally, in various embodiments, the processing module 130 obtains information from the sensor 110 regarding the environment of the remote location 104 via the link 120. In various embodiments, the link 120 may be a fiber optic cable configured for the transmission of laser energy between the processing module 130 and the link 110.

For example, in various embodiments, the processing module 130 may include a laser or other mechanism that provides excitation energy to vibrate the sensor 110, and may be configured to determine two or more resonant frequencies or modes of the sensor 110, for example, based on the response (e.g., amplitude of vibration at various frequencies) of the sensor 110 to the excitation energy. Frequencies at which the response amplitude of the sensor 110 is a relative maximum may be understood as the resonant frequencies or modes of the sensor. Conventional uses of pressure measurement sensors, such as MEMS sensors, may excite a sensor only within a single relatively small range of frequencies, and only track or determine a single resonant frequency. The single determined resonant frequency may then be used in conventional approaches to determine a pressure based on a temperature obtained by a separate sensor or detector. In contrast, various embodiments of the present disclosure excite the sensor 110 at two or more frequency ranges and track or determine two or more resonant frequencies to provide for substantially simultaneous determination of pressure and temperature with a single sensor.

In the illustrated embodiment, the sensor 110 is configured as a MEMS sensor. (For additional details regarding an embodiment of the sensor 110, see FIG. 2.) Generally, in various embodiments, the sensor 110 is configured to have two or more distinct resonant frequencies, or modes, that may be determined using the processing module 130. For example, in one embodiment, the sensor 110 may have a first resonant frequency at about 24 kiloHertz (kHz) and a second resonant frequency at about 44 kHz. Depending on the temperature and pressure, the first and second resonant frequencies may vary. For example, with pressure held constant, the first resonant frequency of the sensor 110 may be 24.6820 kHz at a first temperature, and 24.6795 kHz at a second temperature. The above resonance values are intended by way of example only, as other values may exist for various embodiments.

Further, the type, direction, and/or amount of variance of the resonant frequencies with respect to changes in temperature and pressure may differ from each other. (For additional discussion regarding different variabilities for resonant frequencies, see FIG. 3.) For example, the sensor 110 may have a first variability for a first resonant frequency with respect to an environmental parameter, and a second variability for a second resonant frequency with respect to the environmental parameter. The environmental parameter for which the resonant frequencies vary may be, for example, pressure, temperature, or a combination thereof. The first variability and the second variability may have different slopes or tendencies. For example, the first resonant frequency may increase with an increase in temperature while the second resonant frequency may decrease with an increase in temperature. As another example, each of a first and second resonant frequencies may increase (or decrease) with an increase in temperature, but the first resonant frequency may increase (or decrease) at a higher rate with temperature change than the second resonant frequency. As one more example, the type or shape of variance with temperature change may differ. For example, a first resonant frequency may vary linearly with temperature change, while a second resonant frequency may vary non-linearly with temperature change.

Thus, because the variabilities (or changes in resonant frequency) differ for the first and second resonant frequencies, different combinations of first and second resonant frequencies may correspond to and define particular combinations of pressure and temperature. Thus, for example, in some embodiments, each particular first resonant frequency and second resonant frequency combination may correspond to a particular combination of pressure and temperature. The precise relationship of the resonant frequency combinations to pressures and temperatures may be determined, for example, by experimental means. In various embodiments, a particular sensor 110 may be calibrated. For instance, the sensor 110 may be subjected to a number of known pressure and temperature combinations, with the resulting first and second resonant frequencies tabulated (e.g., cross-referenced) with the pressure and temperature. The table may be then be stored, and used to identify the pressure and temperature for a given first and second resonant frequency combination. In various embodiments, the experimentally collected data may be used to provide a formula (or formulas) for determining pressure and temperature as outputs of different combinations of resonant frequencies, allowing for estimations of pressure and temperature for values that may not have been experimentally tested.

In some embodiments, more than two resonant frequencies may be employed for redundancy, or to account for margins of errors in calibration measurements for determining resonant frequency, and/or to account for margins of errors in curve-fitting or other estimation of the precise relationship between variations in resonant frequencies and environmental parameters such as pressure and temperature.

In various embodiments, a general relationship between first and second (and, in some embodiments, additional) resonant frequencies as inputs and pressure and temperature as outputs may be prepared for a type or model of sensor. For example, finite element analysis (FEA) or other modeling techniques may be used to develop a general form of the relationship between two or more resonant frequencies and one or more environmental parameters, such as temperature and/or pressure. The general form, for example, may include a number of constants and/or coefficients. The particular value of the constants may vary by individual sensors. Each individual sensor may be separately calibrated to determine the precise values of the constants to be used for the particular sensor.

Generally, the processing module 130 of the depicted embodiment is configured to modulate the intensity of an excitation energy at two or more frequencies or frequency ranges to the sensor 110, to determine two or more resonant frequencies of the sensor 110 based on the response of the sensor 110 to the excitation energy, and to determine the pressure and temperature of the remote location 104 based on the two or more resonant frequencies of the sensor 110.

In the embodiment illustrated in FIG. 1, the processing module 130 includes an acquisition module 132, a determination module 134, an input module 136, a display module 138, and a memory 140. The various modules are depicted schematically as forming a single unit, but, in various embodiments, for example, two or more separate physical units or devices may be used in conjunction with various of the depicted modules. For example, in some embodiments, an interrogator device may include the acquisition module, while a personal computer (PC) or other computing device may include the determination module 134, the input module 136, and the display module 138.

Generally, in the illustrated embodiment, the acquisition module 132 is configured to acquire resonant frequency information corresponding to the sensor 110 disposed in the remote location 104 from the acquisition module. In various embodiments, the resonant frequency information may include first resonant frequency information corresponding to a first resonant frequency of the sensor corresponding to environmental conditions of the remote location 104, and also include second resonant frequency information corresponding to a different, second resonant frequency of the sensor 110 corresponding to the environmental conditions of the remote location 104. In some embodiments, the acquired or obtained resonant frequency information may include additional resonant frequencies or modes (e.g., a third resonant frequency, a fourth resonant frequency). Resonant frequency information as used herein, for example, may include a value or measure for a resonant frequency itself, and/or may include information from which a resonant frequency may be determined (e.g., a data set including various frequencies and respective amplitudes of the sensor 110 at each of the frequencies). In various embodiments, the resonant frequency information may also include a time stamp corresponding to a time at which the information was obtained. The time stamp information, for example, may be employed to group two or more data sets together based on similarity in a time of acquisition. For example, a first resonant frequency determined at a first time may be correlated to a second resonant frequency determined at a second time that is proximal to the first time (e.g., within a predetermined time range, such as within about 10 seconds, within about 20 seconds, within about 30 seconds, within about 60 seconds).

In various embodiments, the acquisition module 132 may be configured to optically excite the sensor 110 via a fiber optic cable. For example, the acquisition module 132 may include a laser configured to provide energy optically to the sensor 110, causing a vibration that may be determined. Frequencies at which the amplitude of the vibration reaches a relatively large or local maximum value may be determined to be resonant frequencies. In various embodiments, for example, the acquisition module 132 may include two lasers configured to transmit laser energy via the link 120 to the sensor 110 at two separate wavelengths. The intensity of one laser wavelength may be modulated or vary, while the other laser wavelength remains generally constant. The laser energy at the wavelength which remains generally constant may reflect off the sensor 110 (e.g., reflect off the surfaces of a cap and the vibrating membrane of the sensor), with the energy from the reflections interfering with each other to provide a modulated signal at the frequency of the vibrating membrane and proportional to the amplitude of vibration. The reflected signal may be analyzed by the acquisition module 132 to determine the resonant frequency. For example, the acquisition module 132 may be configured to track the resonant frequency of the sensor 110, with the acquisition module 132 utilizing a closed loop control scheme to change or control a drive frequency (e.g., a frequency of laser energy at the wavelength that is intensity modulated provided to the sensor 110) to lock on to or track the resonant frequency. In other embodiments, an amplitude of vibration may be determined for a number of frequencies within a range of an expected resonant frequency or mode, with the local maximum, possibly determined by a curve fit, corresponding to a resonant frequency.

To acquire information corresponding to a second (or other additional) resonant frequency, the acquisition module 132 may modulate the intensity of one or more lasers to a drive frequency corresponding to the second (or other additional) resonant frequency, for example, to a frequency or frequencies within a range of the expected second (or other additional) resonant frequency. In various embodiments, the acquisition module 132 may obtain the first resonant frequency information and the second resonant frequency information in alternating fashion over one or more predetermined time intervals. For example, the acquisition module 132 may obtain the first resonant frequency information over a relatively small time frame (e.g., about 5 to about 10 seconds), then switch frequencies used to drive a laser to obtain the second resonant frequency information over a relatively small time frame (e.g., about 5 to 10 seconds), then switch back to the original frequency to obtain additional first resonant frequency information corresponding to a second time period, and so on.

The first and second resonant frequency information may be obtained at substantially simultaneous time periods. The first and second resonant frequency information may be understood as being obtained substantially simultaneously when the first and second resonant frequency information are obtained at adjacent time periods of relative short duration (e.g., in various embodiments, about 5 seconds, about 10 seconds, or about 30 seconds, among others), or with relatively small amounts of time between collection of the first and second resonant frequency information (e.g., in various embodiments, about 5 seconds, about 10 seconds, or about 30 seconds, among others). In some embodiments, for example, resonant frequency information obtained with relatively small time periods in between first and second resonant frequency information collection periods (e.g., about 1 second, about 5 seconds, about 10 seconds, or the like). Such relatively small time periods may also be performed in an alternating or overlapping manner as well as discussed herein. The time periods may be understood as relatively small in that the temperature of the remote location 104 may be expected to not change or to change insubstantially over the time period. For example, the temperature of a geothermal well may be expected to not change or to change only slightly over a period of time such as 5, 10, or 30 seconds.

In the illustrated embodiment, the determination module 134 obtains the resonant frequency information from the acquisition module 132, and determines the pressure and temperature of the remote location 104 using the resonant frequency information (e.g., the first resonant frequency information corresponding to the first resonant frequency of the sensor 110 at the environmental conditions of the remote location 104, and the second resonant frequency information corresponding to the second resonant frequency of the sensor 110 at the environmental conditions of the remote location 104). For example, in some embodiments, the determination module may be configured to determine the temperature and pressure using a predetermined calibrated relationship between the resonant frequencies and the pressure and temperature. The predetermined calibrated relationship may be experimentally determined for the sensor 110. Generally, the predetermined calibrated relationship may be configured to use the first resonant frequency information and the second resonant frequency information as an input and to provide the temperature and pressure as an output. In various embodiments, the predetermined calibrated relationship may have a general type or form that corresponds to a type (e.g., model number or other specific configuration) of sensor, with various constants determined for each individual sensor 110.

For example, in one example scenario, a particular design or configuration of sensor (e.g., a particular housing configuration, size and type of resonator, materials used) may have a general formula or formulae specifying the relationship between one or more environmental parameters and two or more resonant frequencies. For example, the pressure for a given combination of resonant frequencies may be given by $P=C_1+C_2*f_1(R_1)+C_3*f_2(R_2)$, where P is pressure, $C_1$, $C_2$, and $C_3$ are constants, $R_1$ is the first resonant frequency, $R_2$ is the second resonant frequency, $f_1$ is a function of the first resonant frequency, and $f_2$ is a function of the second resonant frequency. Also, the temperature for a given combination of resonant frequencies may be given by $T=C_4+C_5*f_3(R_1)+C_6*f_4(R_2)$, where T is temperature, $C_4$, $C_5$, and $C_6$ are constants, $R_1$ is the first resonant frequency, $R_2$ is the second resonant frequency, $f_3$ is a function of the first resonant frequency, and $f_4$ is a function of the second resonant frequency. In various embodiments, the constants may vary by individual sensor while the functions remain the same for a given type or model of sensor, while, in other embodiments, the constants and functions (e.g., coefficients of one or more functions) may vary by individual sensor. It should be noted that the above formulae are provided by way of example only, and that other (e.g., more complicated or complex) forms or types of relationships between resonant frequencies and pressure and temperature may be utilized in various embodiments. In some embodiments, the general form for a type or model of sensor may be determined by experimental calibration of a prototype, for example, while in other embodiments, the general from for a type or model of sensor may be determined by finite element analysis (FEA) or other type of modeling.

In the illustrated embodiment, the input module 136 is configured to receive one or more inputs, for example, from a user. The input module 136 may include one or more of a touchscreen, keyboard, mouse, keypad, or the like. For example, a user may input a model number or other designator for a type of sensor to be used. The model number or other designator may be provided to the determination module 136 and used to select or define a particular form of relationship between resonant frequency and environmental parameters. For example, a user may scan a barcode with a reader to provide a model number, select a model number from a pull down menu, enter a model number using a keypad, or the like. Further, a user may input particular calibration constants for an individual sensor to be used in determining the pressure and temperature. Additionally or alternatively, a user may utilize the input module 136 to input, for example, a request or specification of particular units for display of pressure (e.g., psi) and/or temperature (e.g., degrees Celsius, degrees Fahrenheit). Further, a user may utilize the input module 136 to input settings such as collection time for a given frequency, and/or one or more nominal resonant frequencies (e.g., a frequency representative of the range within a given resonant frequency may vary). The display module 138 in the illustrated embodiment is configured to provide a user with a display, such as a display indicating the value of pressure and/or temperature. In various embodiments, the display module 138 may be configured to display one or more of a setting (e.g., a nominal resonant frequency, a collection time for a given frequency range, or the like) or a value of a non-environmental parameter (e.g., one or more resonant frequencies of the sensor 110).

Thus, in various embodiments, a single link (e.g., fiber optic) may be used with a single sensor to provide temperature and pressure both detected at a common or identical location (the position of sensor). Further, pressure and temperature may be determined using substantially simultaneously obtained information corresponding to plural resonant frequencies or modes of a sensor.

Figure 2:
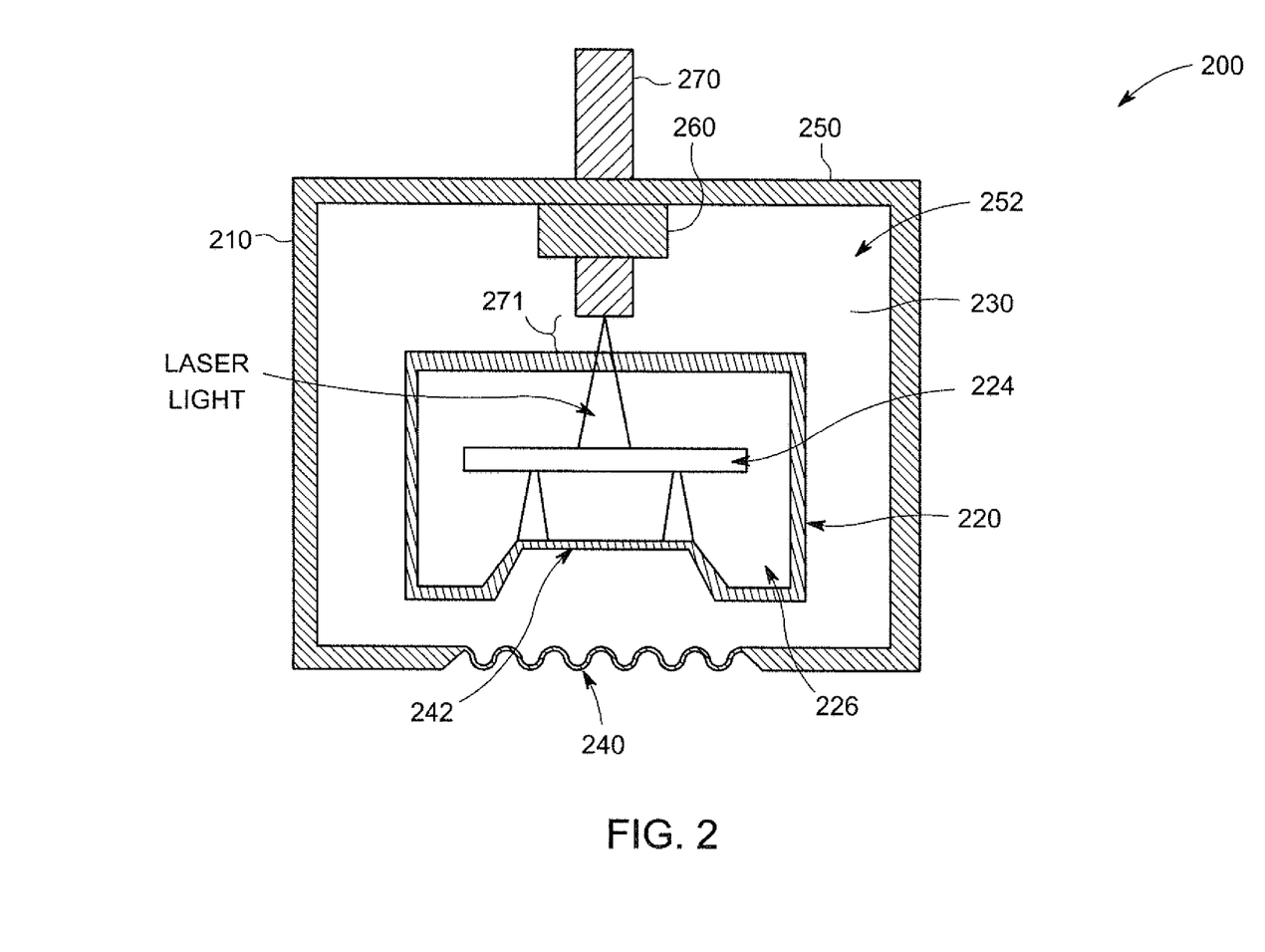
FIG. 2 is a schematic block diagram of a sensor in accordance with various embodiments.

FIG. 2 illustrates a sensor system 200 formed in accordance with various embodiments. The sensor system 200 includes a sensor 210 operably connected with a fiber optic cable 270. The fiber optic cable 270 may be configured to transmit laser energy between the sensor 210 and a processing module (not shown in FIG. 2), such as the processing module 130 discussed in connection with FIG. 1.

The sensor 210 depicted in FIG. 2 includes a housing 250, a die 220, a liquid 230, and a membrane 240. In various embodiments, the membrane 240 may be disposed along a bottom surface of the housing 250, with the membrane 240 configured to flex with changing pressure. With the membrane 240 disposed along the bottom, as the membrane 240 flexes, the membrane 240 will not affect light from the fiber optic cable 270 entering the top (or surface opposite the membrane 240) of the housing 250. Generally, in various embodiments, the sensor 210 is configured to receive optical energy (e.g., laser energy at one or more frequencies) from the fiber optic cable 270. The wavelength of the laser is selected so that its energy is not absorbed by the cap of the sensor, but is either partially reflected or transmitted through the sensor cap to the die 220. The die 220 is designed to partially absorb the laser energy, causing the temperature of the die 220 to vary slightly at the modulation frequency of the laser, which in turn causes a vibration of the die 220 (e.g., vibration of a resonator within the die 220) at the modulation frequency of the laser. The housing 250 is configured to house and support the die 220, and may be considered an external packaging for the die 220. The housing 250 in the illustrated embodiment includes a cavity 252 configured to retain the die 220 and liquid 230. For example, two membranes may be employed. The liquid 230 (e.g., liquid silicone oil) may be maintained between the membrane 240 (e.g., an outer metallic membrane of the housing 250 or package) and the silicon sensor die 220, with liquid 230 configured to transduce the outer pressure to the die 220. The oil may or may not be also between the end of the fiber optic cable 270 and the die 220. In the illustrated embodiment, there is also a thin silicon membrane 242 that may be understood as part of the die 220. When the thin silicon membrane 242 flexes, the thin silicon membrane 242 applies stress to the vibrating resonator 224 inside the die 220, thereby changing the frequency of vibration. The die 220 includes an interior chamber 222 configured to maintain a vacuum around the resonator 224. The configuration (e.g., shape, dimensions, materials) of the housing 250 (as well as the membrane 240) influence the particular locations along a spectrum for the resonant frequencies or modes as well as the variability (e.g., variability with temperature and/or pressure) of the resonant frequencies or modes of the sensor 210. Thus, by varying the design or configuration of the housing 250 and/or related components, the resonant frequencies or modes (as well as the variability of the resonance frequencies or modes) may be altered or controlled. As one example, utilizing a more rigid geometry and/or more rigid material may result in less variation of resonant frequencies or modes with changes in pressure. As another example, different materials may have different thermal properties and therefore be utilized to provide different variations in resonant frequencies with temperature. Resonant modes or frequencies for a given design or configuration may be evaluated by testing of prototypes and/or use of analytical models (e.g., FEA models), with the given design or configuration modified in an iterative fashion to provide desired nominal resonant frequencies and/or desired variability with pressure or temperature for resonant frequencies.

Figure 5:
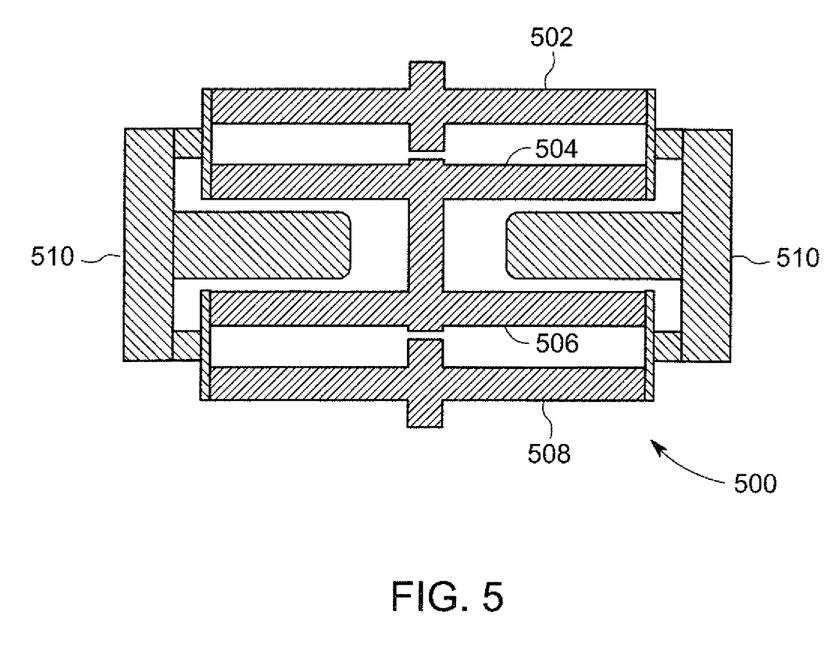
FIG. 5 is a plan view of a resonator assembly in accordance with various embodiments.

In some embodiments, thin films may also be deposited onto a resonator in order to change the temperature dependence of the vibrational frequencies of different vibrating modes of the resonator. FIG. 5 illustrates a top view of a resonator assembly 500 in accordance with various embodiments. The depicted resonator assembly 500 includes a first beam 502, a second beam 504, a third beam 506, and a fourth beam 508 supported at ends of the beams by a silicon substrate 510. The depicted resonator 500 may thus be understood as a four beam resonator. Such a resonator may have two or more vibrational modes. For example, a first mode may correspond to vibrations at about 22.60 kHz and involve a twisting motion in which only the outer two beams (the first beam 502 and the fourth beam 508 in the illustrated embodiment) are substantially moving. The first beam 502 and the fourth beam 508 may move out of phase with each other in the first mode. The second mode may correspond to vibrations at about 22.67 kHz and involve motion of all four beams. For the second mode, the inner two beams (the second beam 504 and the third beam 506 in the illustrated embodiment) may vibrate in phase with each other and the outer two beams may vibrate in phase with each other, but the outer and inner beams may vibrate out of phase with respect to each other. If a thin film is deposited onto only the inner two beams, the thin film will change the mass of the inner two beams, thereby changing the resonant frequency of all modes that involve motion of the inner two beams, while not substantially affecting the resonant frequency of modes that do not involve significant motion of the inner two beams. Thus, a thin film may be added to one or more beams to alter a given mode of vibration while not substantially altering a different mode of vibration.

Moreover, if a thin film applied to one or more beams or other aspect of a resonator has substantially different thermal properties (e.g., one or more of thermal conductivity, coefficient of thermal expansion, or specific heat) than those of the aspect of the resonator to which the thin film is applied, then the application of the thin film will also change the temperature dependence of the frequency of those modes which involve substantial motion of the beams (or other aspects of the resonator) coated with the thin film, while not substantially affecting the resonant frequencies of the modes that do not involve substantial motion of beams covered with the thin film. In some embodiments, the thin film may be a dielectric, such as silicon oxide, which has a substantially lower thermal conductivity than that of silicon (which may be used for beams and/or other aspects of a resonator). Other examples of dielectric materials that may be used in various embodiments include $SiO_2$, SiN, SiC, SiON, MN, $Al_2O_3$, or $TiO_2$. As another example, the thin film may be made of a metal, such as aluminum, which has a substantially greater thermal conductivity and coefficient of thermal expansion than that of silicon. Other examples of metals that may be used in various embodiments include Au, Ni, Cr, or NiCr. In still other embodiments, a thin film coating may include at least two layers of differing materials. For example, a thin film coating may include a first metallic layer and a second dielectric layer. As another example, a thin film coating may include a first layer of a first metal and a second layer of a different, second metal. As yet one more example, a thin film coating may include alternating layers of different materials.

In the case of an aluminum or other metallic film, for example, as the temperature of the die rises from the external environment, the aluminum film thermally expands more than that of the silicon to which the aluminum film is bonded, thereby applying stress to the silicon beams. The increased stress will tend to raise the frequency of vibration of every mode which involves motion of these beams. However, it will have a much smaller effect on the frequency of vibration for every mode which does not involve motion of these beams. Therefore, by appropriate deposition of thin films onto the resonator, the temperature dependence of different vibrational modes may also be adjusted.

Returning to FIG. 2, in the illustrated embodiment, the die 220 is positioned in the cavity 252 and may be partially or entirely surrounded by the liquid 230. In various embodiments, for example, the die 220 may be of silicon construction, and may respond to energy from the fiber optic cable (transferred to the die 220 via t the liquid 230) by vibrating. The vibration of the die 220 may then be determined (e.g., by a processing module obtaining optical energy reflected off the sensor 210) and used to identify resonant frequencies, which may in turn be utilized to determine pressure and temperature that the sensor 210 is subject to.

As seen in FIG. 2 and also discussed elsewhere herein, the die 220 of the depicted embodiment includes a chamber 222 in which a resonator 224 is disposed. The resonator 224 in the illustrated embodiment is the portion of the die 220 for which the resonant vibration is determined. The resonator in various embodiments may include one or more beams configured to vibrate under the influence of provided energy (e.g., laser light or energy provided via the fiber optic cable 270). The configuration (size, shape, dimensions, materials) of both the die 220 and the resonator 224 influence the value of the resonant frequencies or modes. For example, the resonator 224 may generally be configured of silicon construction. However, as discussed herein, for example in connection with FIG. 5, in various embodiments, a coating of a material with a relatively high thermal conductivity (e.g., a metal) may be provided upon the resonator 224 to increase the variability of one or more resonant frequencies with changes in temperature.

In the illustrated embodiment, the housing 250 includes a cable fitting 260 configured to maintain an end of the fiber optic cable 270 at a desired gap 271 from the top of the die 220. For example, the gap 271 in some embodiments may be about 100 microns. The cable fitting 260 may be configured to maintain the gap 271 at or near a desired level over relatively large temperature ranges, as the sensor 210 may be placed in different environments exposed to widely differing temperatures.

Figure 3:
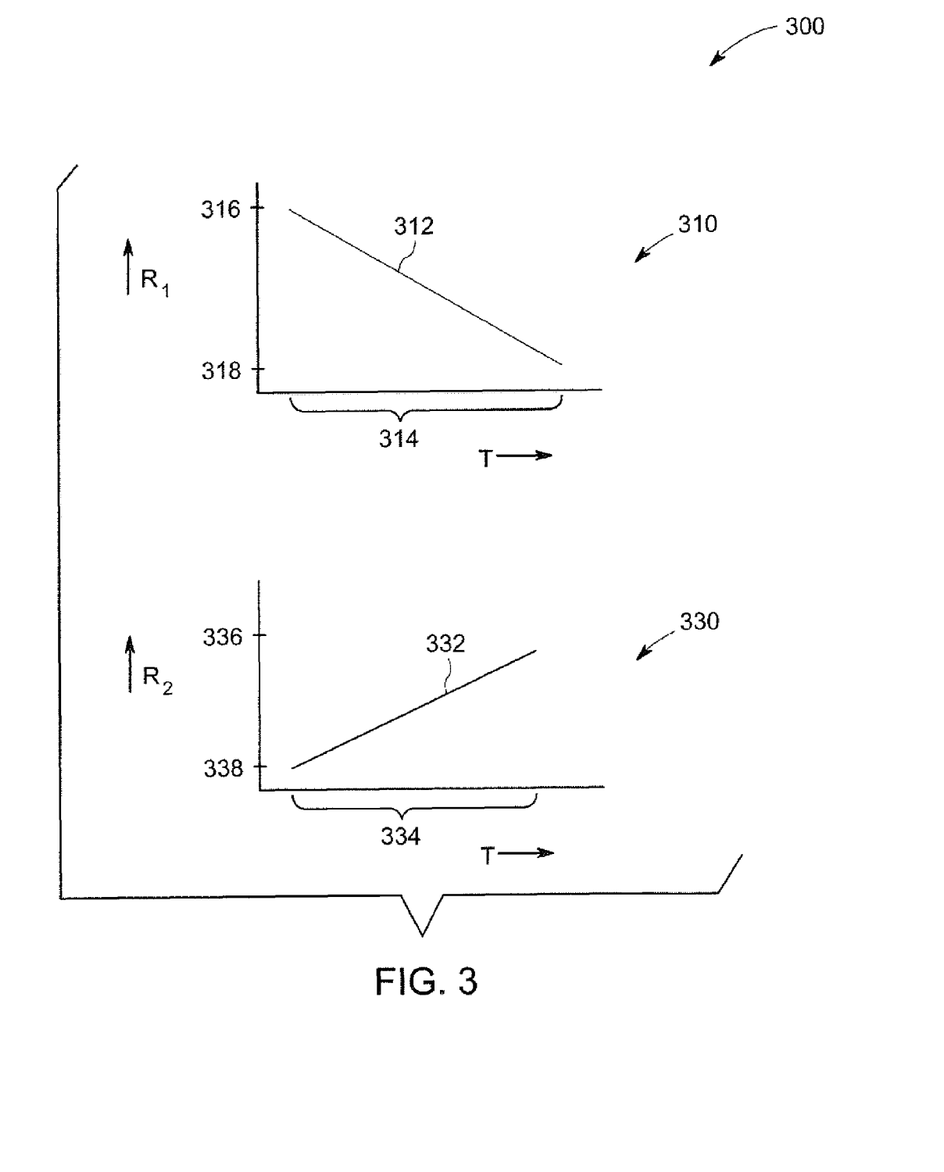
FIG. 3 is a view of an example of differing variances of resonant frequencies in accordance with various embodiments.

FIG. 3 illustrates a group 300 of resonant frequency variability curves 310, 330 in accordance with an embodiment. In the illustrated embodiment, a first resonant frequency curve 310 corresponds to the variability of a first resonant frequency (or mode) of a sensor (e.g., sensor 110, sensor 210) with respect to temperature, and a second resonant frequency curve 330 corresponds to the variability of a second resonant frequency (or mode) of the sensor with respect to temperature. For example, the first resonant frequency may have a nominal value of about 24 kHz, and the second resonant frequency may have a nominal value of about 44 kHz. In the illustrated embodiment, the first resonant frequency decreases with increase in temperature, whereas the second resonant frequency increases with increase in temperature. Thus, the first resonant frequency curve 310 has a negative slope 312 and the second resonant frequency curve 330 has a positive slope 332. In the illustrated embodiment, therefore, the first and second resonant frequency curves have slopes oriented in opposite directions; however, in other embodiments, the first and second resonant frequency curves may have slopes oriented in the same direction but having different values. In the illustrated embodiments, variability is depicted with respect to temperature. Generally, certain similar concepts may also apply to variability curves with respect to changes in pressure in various embodiments. In the illustrated embodiment, the variabilities are depicted as linear and having a continuous or constant slope. Other forms of variabilities (e.g., non-linear, non-continuous) may exist in other embodiments. Generally, because the first and second resonant frequencies vary differently with respect to changes in pressure and/or temperature, different combinations of first and second resonant frequencies may be used to identify corresponding different combinations of pressure and temperature. Put another way, in various embodiments, each particular pairing of a first and second resonant frequency may correspond to a particular pairing of temperature and pressure values.

In the illustrated embodiment, the first resonant frequency curve 310 is depicted on a graph having a horizontal axis corresponding to temperature and a vertical axis corresponding to resonant frequency. The first resonant frequency curve 310 may be provided over a temperature range 314 (e.g., a temperature range the sensor may be configured for, designed for, or expected to encounter). At the lowest end of the temperature range, the first resonant frequency is at a maximum 316, and the first resonant frequency is at a minimum 318 at the higher end of the temperature range 314. As one example, the nominal first resonant frequency may be 24 kHz, the maximum 316 may be about 24.6820 kHz, and the minimum 318 may be about 24.6795 kHz.

Also, in the illustrated embodiment, the second resonant frequency curve 330 is depicted on a graph having a horizontal axis corresponding to temperature and a vertical axis corresponding to resonant frequency. The second resonant frequency curve 330 may be provided over a temperature range 334 (e.g., a temperature range the sensor may be configured for, designed for, or expected to encounter). At the lowest end of the temperature range, the second resonant frequency is at a minimum 338, and the second resonant frequency is at a maximum 336 at the higher end of the temperature range 334. As one example, the nominal second resonant frequency may be 44 kHz, the maximum 336 may be about 44.07 kHz, and the minimum 338 may be about 44.03.

It should be noted that the particular values used in conjunction with FIG. 3 are meant for illustrative purposes and by way of example. Other values may be present in various embodiments. Further, additional nominal resonant frequencies or modes may be employed in various embodiments.

Figure 4:
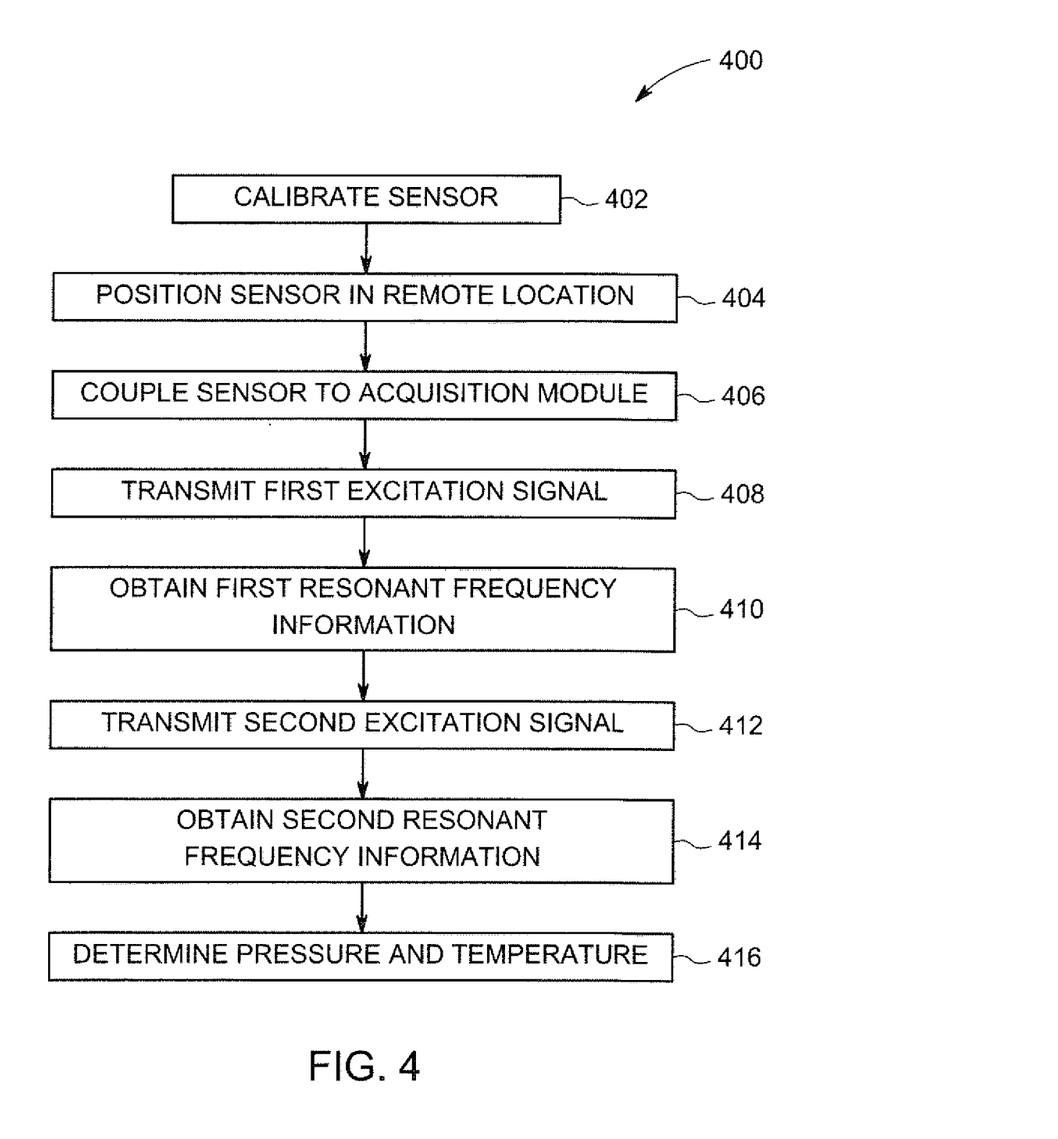
FIG. 4 is a flowchart of a method for determining pressure and temperature in accordance with various embodiments.

FIG. 4 provides a flowchart of a method 400 for determining pressure and temperature, for example temperature and pressure of a remote location in which a sensor is disposed. In various embodiments, the method 400, for example, may employ structures or aspects of various embodiments (e.g., systems and/or methods) discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. In various embodiments, portions, aspects, and/or variations of the method 400 may be able to be used as one or more algorithms to direct hardware to perform operations described herein.

At 402, a sensor is calibrated. The sensor, for example, may be configured as a MEMS sensor. The sensor, for example, may include a resonator designed to vibrate when the sensor is subject to energy, such as optical energy (e.g., laser energy). Plural resonant frequencies (e.g., first and second resonant frequencies) of the sensor may vary differently with one or more environmental measurement parameters, such as temperature or pressure, for example. Thus, a given particular combination of determined resonant frequencies (or modes) may define a particular combination of pressure and temperature. The sensor may be calibrated, for example, by measuring the resonant frequencies of the sensor at various pressure and temperature combinations. The calibration results may then be used, for example, by a determination module, to determine a pressure and temperature based on resonant frequencies measured at a given location being monitored. The calibration results may be used in a table form, for example with weighted or averaged values for neighboring entries used for intermediate values not experimentally tested. As another example, the calibration data may be analyzed by curve-fitting or other analytic technique to develop a mathematical relationship between resonant frequencies and temperature and pressure. The calibration results may be in the form of constants and/or coefficients for use with a general equation for a given type or model of sensor.

At 404, the sensor is positioned in a remote location for which environmental measurement parameters such as pressure and temperature are desired to be determined. The remote location may be subject to a high pressure and/or high temperature that renders the remote location inappropriate for use with conventional measurement devices such as thermocouples. As one example, the remote location may be a geothermal well. As another example, the remote location may be an oil well.

At 406, the sensor is coupled to an acquisition module. The acquisition module, for example, may be an interrogation unit operably coupled to a personal computer or other computing device. The interrogation unit may include one or more lasers configured to provide optical energy that is modulated in intensity at various frequencies. The sensor may be coupled to the acquisition module via a link such as a fiber optic cable. The fiber optic cable may be secured in a precise positioning relative to the sensor (e.g., at a predetermined gap from a surface to be impacted by a laser transmitted by the fiber optic cable, at a predetermined angle or alignment so that the laser strikes the sensor at a predetermined location and/or at a predetermined angle). A model number and/or individual calibration information for the sensor may be entered into a determination module (e.g., a personal computer operably connected to the interrogation unit).

At 408, a first excitation signal is transmitted. For example, a laser generated by the acquisition module (e.g., interrogation unit) may be transmitted via the fiber optic cable to impinge upon the sensor. In some embodiments, the first excitation signal may include energy at a first wavelength that is modulated at a first or drive frequency that is set at or near a nominal resonant frequency or mode of the sensor, and energy at a second wavelength that is not modulated. For example, the first or drive frequency at the first wavelength may be varied while the second wavelength may be held generally constant.

At 410, first resonant frequency information is obtained. The first resonant frequency information may correspond to vibration (e.g., amplitude of vibration) of the sensor when the sensor is subjected to the first excitation signal. The first resonant frequency information may include an identification of the first resonant frequency and/or information from which the first resonant frequency may be determined, as well as timing information (e.g., a time stamp indicating a time at which the first resonant frequency information was obtained). In various embodiments, interference between reflected signals from light energy at the second wavelength caused by the first (or drive) energy at the first wavelength may be used to determine resonant frequency. It may be noted that interference effects that generate the readback signal may be due to light waves of the second wavelength laser alone that are reflected off different surfaces, such as the cap surfaces and the resonator surfaces. For example, the acquisition module may include a closed loop control circuit or scheme configured such that the drive frequency locks onto and tracks the resonant frequency. Thus, the drive frequency may be determined to be the resonant frequency. In other embodiments, the drive frequency may be varied independent of the reflected signal, and amplitudes corresponding to particular frequencies within a predetermined range of the nominal resonant frequency may be analyzed to identify a local maximum amplitude. The frequency corresponding to the local maximum amplitude may be determined to be the resonant frequency. Curve fitting may be employed to accurately determine the resonant frequency when it lies between measured data points. In some embodiments, the determination of the resonant frequency may be performed by the acquisition module, while in some embodiments the determination of the resonant frequency may be performed by the determination module. The first resonant frequency information may be obtained over a first resonant frequency information collection period having a relatively short duration (e.g. about 5-10 seconds), with the acquisition module changing drive frequency to determine a second or different resonant frequency of the sensor upon completion of the first resonant frequency information collection period.

At 412, a second excitation signal is transmitted. The second excitation signal may be transmitted during a second resonant frequency information collection period subsequent to the first resonant frequency information collection period, for example immediately following the first resonant frequency information collection period. The second excitation signal may be transmitted in a generally similar fashion (e.g., using the same fiber optic cable, striking the same portion of the same sensor, and/or provided by the same laser) as the first excitation signal. However, the second excitation signal is modulated at at least one frequency that differs from the modulation frequency of the first excitation signal. For example, instead of having a drive frequency at or near a nominal first resonant frequency as for the first excitation signal, the second excitation signal may utilize a drive frequency that is at or near a nominal second resonant frequency that differs from the first resonant frequency. For example, in some embodiments, the nominal first resonant frequency may be about 24 kHz and the nominal second resonant frequency may be about 44 kHz.

At 414, second resonant frequency information is obtained. The second resonant frequency may be obtained in generally similar fashion to the first resonant frequency information. In various embodiments, one or more additional or alternative resonant frequencies (e.g., third resonant frequency, fourth resonant frequency, and so on) may be determined. For example, additional resonant frequencies may provide redundancy or additional information where a margin of error in calibrated and/or measured information may prevent two resonant frequencies from identifying a particular pressure and temperature with a satisfactory confidence level. As another example, some resonant frequencies may be more effective for determining environmental conditions in a first temperature range, while other resonant frequencies may be more effective for determining environmental conditions in a second temperature range. Thus, in various embodiments, different combinations of resonant frequencies may be employed for different temperature and/or pressure ranges. In various embodiments, collection of the first and second resonant frequency information (and/or additional information for additional resonant frequencies) may be performed in an alternating fashion. For example, the first resonant frequency information and the second resonant frequency information may be obtained in an alternating fashion over predetermined time intervals.

At 416, the pressure and temperature of the remote location at which the sensor is disposed are determined. The pressure and temperature may be determined using a determination module that includes at least one processor and at least one tangible, non-transitory memory. The pressure and temperature are determined based on the values of plural resonant frequencies of the sensor, for example using the first and second resonant frequency information. In various embodiments, the pressure and temperature may be determined using a predetermined relationship between resonant frequencies and pressure and temperature. In the depicted embodiment, both temperature and pressure of the remote location are determined. However, in some embodiments, only pressure or only temperature may be determined.

Thus, for example, in various embodiments, pressure and temperature of a given location may be determined using two or more determined resonant frequencies of a sensor disposed at the location. In various embodiments, a single sensor may be used to determine pressure and temperature.

It should be noted that the particular arrangement of components (e.g., the number, types, placement, or the like) of the illustrated embodiments may be modified in various alternate embodiments. In various embodiments, different numbers of a given module or unit may be employed, a different type or types of a given module or unit may be employed, a number of modules or units (or aspects thereof) may be combined, a given module or unit may be divided into plural modules (or sub-modules) or units (or sub-units), a given module or unit may be added, or a given module or unit may be omitted.

It should be noted that the various embodiments may be implemented in hardware, software or a combination thereof. The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid state drive, optical drive, and the like. The storage device may also be other similar means for loading computer programs or other instructions into the computer or processor.

As used herein, the term "computer," "controller," and "module" may each include any processor-based or microprocessor-based system including systems using microcontrollers, reduced instruction set computers (RISC), application specific integrated circuits (ASICs), logic circuits, CPUs, FPGAs, and any other circuit or processor capable of executing the functions described herein. The above examples are exemplary only, and are thus not intended to limit in any way the definition and/or meaning of the term "module" or "computer."

The computer, module, or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer, module, or processor as a processing machine to perform specific operations such as the methods and processes of the various embodiments described and/or illustrated herein. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program. The individual components of the various embodiments may be virtualized and hosted by a cloud type computational environment, for example to allow for dynamic allocation of computational power, without requiring the user concerning the location, configuration, and/or specific hardware of the computer system.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments, and also to enable a person having ordinary skill in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal languages of the claims.

What is claimed is:

1. A measurement system comprising: an acquisition module, a sensor, and a determination module, the sensor configured to be disposed in a remote location, the acquisition module configured to acquire resonant frequency information from the sensor when the sensor is disposed in the remote location from the acquisition module, the resonant frequency information including first resonant frequency information for a first resonant frequency of the sensor corresponding to environmental conditions of the remote location, the resonant frequency information including second resonant frequency information for a different, second resonant frequency of the sensor corresponding to the environmental conditions of the remote location, the sensor comprising plural beams, the plural beams comprising a first group of beams that have a thin film coating and a second group of beams that do not have the thin film coating, wherein the first resonant frequency corresponds to a first vibrational mode corresponding to vibration of only the second group of beams and the second resonant frequency corresponds to a second vibrational mode corresponding to vibration of at least the first group of beams, the determination module configured to determine a temperature and a pressure at the remote location, the determination module configured to use the first resonant frequency information and the second resonant frequency information to determine the temperature and the pressure.

2. The system of claim 1, wherein the determination module is configured to determine the temperature and pressure using a predetermined calibrated relationship that has been experimentally determined for the sensor, the predetermined calibrated relationship using the first resonant frequency information and the second resonant frequency information as an input and providing the temperature and pressure as an output.

3. The system of claim 1, wherein the sensor is a microelectromechanical system (MEMS) sensor having four beams supported at respective ends by a substrate, wherein the first group of beams comprises two inner beams and the second group comprises two outer beams.

4. The system of claim 1, wherein the acquisition module is configured to obtain additional resonant frequency information corresponding to at least one additional resonant frequency of the sensor, and wherein the determination module is configured to determine the pressure and temperature using the additional resonant frequency information in addition to the first resonant frequency information and the second resonant frequency information.

5. The system of claim 1, wherein the first and second resonant frequency information are obtained via a single fiber optic operably connected to the sensor.

6. The system of claim 5, wherein the acquisition module is configured to transmit a laser via the fiber optic to the sensor, the acquisition module configured to transmit a first laser beam that is modulated at about the first resonant frequency at a first time and to transmit a second laser beam that is modulated at about the second resonant frequency at a subsequent, second time.

7. The system of claim 1, wherein the thin film coating is configured to provide the first resonant frequency with a first variability with respect to temperature that is different from a second variability with respect to temperature of the second resonant frequency, and wherein the first variability defines a slope in a first direction and the second variability defines a slope in an opposite, second direction.

8. The system of claim 1, wherein the sensor comprises four beams supported at respective ends by a substrate, wherein the first vibrational mode comprises a twisting in which beams of the second group vibrates out of phase with each other.

9. The system of claim 1, wherein the thin film coating comprises a dielectric material.

10. The system of claim 1, wherein the thin film coating comprises a metal.

11. The system of claim 1, wherein the thin film coating comprises at least two layers of differing materials.

12. A method comprising: obtaining, from a sensor disposed in a remote location, first resonant frequency information corresponding to a first resonant frequency of the sensor, the first resonant frequency corresponding to environmental conditions of the remote location; obtaining, from the sensor, second resonant frequency information corresponding to a different, second resonant frequency of the sensor, the second resonant frequency corresponding to the environmental conditions of the remote location, wherein the sensor comprises plural beams, the plural beams comprising a first group of beams that have a thin film coating and a second group of beams that do not have the thin film coating, wherein the first resonant frequency corresponds to a first vibrational mode corresponding to vibration of only the second group of beams and the second resonant frequency corresponds to a second vibrational mode corresponding to vibration of at least the first group of beams; and, determining, with a determination module, a temperature and a pressure at the remote location using the first and second resonant frequency information.

13. The method of claim 12, further comprising: obtaining, from the sensor, additional resonant frequency information corresponding to at least one additional resonant frequency of the sensor; and determining, with the determination module, the pressure and temperature using the additional resonant frequency information in addition to the first resonant frequency information and the second resonant frequency information.

14. The method of claim 12, wherein the first and second resonant frequency information are obtained via a single fiber optic operably connected to the sensor.

15. The method of claim 14, wherein the obtaining the first resonant frequency information comprises transmitting a first laser beam via the fiber optic to the sensor that is modulated at about the first resonant frequency at a first time, and the obtaining the second resonant frequency information comprises transmitting a second laser beam that is modulated at about the second resonant frequency at a subsequent, second time.

16. The method of claim 12, wherein the thin film coating provides the first resonant frequency with a first variability with respect to temperature that is different from a second variability of the second resonant frequency with respect to temperature, and wherein the first variability defines a slope in a first direction and the second variability defines a slope in an opposite, second direction.

17. A tangible and non-transitory computer readable medium comprising one or more computer software modules configured to direct one or more processors to: obtain, from a sensor disposed in a remote location, first resonant frequency information corresponding to a first resonant frequency of the sensor, the first resonant frequency corresponding to environmental conditions of the remote location; obtain, from the sensor, second resonant frequency information corresponding to a different, second resonant frequency of the sensor, the second resonant frequency corresponding to the environmental conditions of the remote location, wherein the sensor comprises plural beams, the plural beams comprising a first group of beams that have a thin film coating and a second group of beams that do not have the thin film coating, wherein the first resonant frequency corresponds to a first vibrational mode corresponding to vibration of only the second group of beams and the second resonant frequency corresponds to a second vibrational mode corresponding to vibration of at least the first group of beams; and, determine a temperature and a pressure at the remote location using the first and second resonant frequency information.

18. The computer readable medium of claim 17, wherein the computer readable medium is further configured to direct the one or more processors to: obtain, from the sensor, additional resonant frequency information corresponding to at least one additional resonant frequency of the sensor; and determine the pressure and temperature using the additional resonant frequency information in addition to the first resonant frequency information and the second resonant frequency information.

19. The computer readable medium of claim 18, wherein the computer readable medium is further configured to direct the one or more processors to transmit a first laser beam via a fiber optic to the sensor that is modulated at about the first resonant frequency at a first time, and to transmit a second laser beam that is modulated at about the second resonant frequency at a subsequent, second time.

20. The computer readable medium of claim 17, wherein the first resonant frequency has a first variability with respect to temperature and the second resonant frequency has a different, second variability with respect to temperature, and wherein the first variability defines a slope in a first direction and the second variability defines a slope in an opposite, second direction.

* * * * *